United States Patent
Iacovoni et al.

(10) Patent No.: US 10,465,428 B2
(45) Date of Patent: *Nov. 5, 2019

(54) APPARATUS AND METHOD PROVIDING A FULL WINDOW OPENING ABOVE A DOOR INCLUDING A PIVOTING DIVISION BAR

(71) Applicant: FORD GLOBAL TECHNOLOGIES, LLC, Dearborn, MI (US)

(72) Inventors: Donald P. Iacovoni, Plymouth, MI (US); Paul L. Heirtzler, Jr., Northville, MI (US); Henry W. Hausler, South Lyon, MI (US); Kyle Otremba, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 50 days.

This patent is subject to a terminal disclaimer.

(21) Appl. No.: 15/499,441

(22) Filed: Apr. 27, 2017

(65) Prior Publication Data

US 2018/0313126 A1 Nov. 1, 2018

(51) Int. Cl.
| | |
|---|---|
| *E05F 15/08* | (2006.01) |
| *E05D 15/18* | (2006.01) |
| *E05F 15/60* | (2015.01) |
| *E05D 15/24* | (2006.01) |
| *B60J 1/17* | (2006.01) |

(52) U.S. Cl.
CPC .............. *E05D 15/18* (2013.01); *B60J 1/17* (2013.01); *E05D 15/24* (2013.01); *E05F 15/60* (2015.01); *E05Y 2900/55* (2013.01)

(58) Field of Classification Search
CPC ............ E05D 15/18; E05D 15/165; B60J 5/04; B60J 5/00; B60J 5/0416; B60J 1/17; E05F 15/60; E05Y 2900/55
USPC ............... 49/348, 349, 350, 351, 352
See application file for complete search history.

(56) References Cited

U.S. PATENT DOCUMENTS

| | | | | |
|---|---|---|---|---|
| 2,030,089 A | * | 2/1936 | Anderson | E05F 11/382 296/96.11 |
| 2,122,963 A | * | 7/1938 | Susor | B60J 1/14 49/103 |
| 2,152,055 A | * | 3/1939 | Kegler | E05F 11/382 49/103 |

(Continued)

FOREIGN PATENT DOCUMENTS

WO 2011014684 A1 2/2011

OTHER PUBLICATIONS

Non Final Office Action dated Dec. 6, 2018 for U.S. Appl. No. 15/499,321, filed Apr. 27, 2017.

(Continued)

*Primary Examiner* — Jerry E Redman
(74) *Attorney, Agent, or Firm* — Jason Rogers; Vichit Chea; King & Schickli, PLLC

(57) ABSTRACT

An apparatus includes a door panel having a window receiver and an internal compartment, a window and a division bar pivotally mounted on the pivot. The apparatus also includes a regulator carried on the door panel. The regulator displaces the window and the division bar between a closed position projecting from the window receiver and an opened position concealed fully within the internal compartment of the door panel. A related method is also disclosed.

4 Claims, 18 Drawing Sheets

(56) References Cited

U.S. PATENT DOCUMENTS

| | | | | |
|---|---|---|---|---|
| 2,253,805 A * | 8/1941 | Olivier | E05F 11/382 | 49/145 |
| 2,863,658 A * | 12/1958 | Moyes | E05F 11/382 | 49/144 |
| 2,955,817 A * | 10/1960 | Campbell | E05F 11/445 | 49/103 |
| 3,024,062 A * | 3/1962 | Himka | E05F 15/689 | 296/155 |
| 3,659,381 A * | 5/1972 | Frey | E05F 11/382 | 49/103 |
| 3,670,454 A * | 6/1972 | Gebhard | E05F 11/382 | 49/103 |
| 3,733,748 A * | 5/1973 | Heesch | E05F 11/382 | 49/103 |
| 3,745,703 A * | 7/1973 | Francis | E05F 11/382 | 49/103 |
| 3,782,037 A * | 1/1974 | Heesch | E05F 11/382 | 49/103 |
| 3,788,005 A * | 1/1974 | Mistopoulos, Jr. | E05F 11/445 | 49/103 |
| 3,816,962 A * | 6/1974 | Ladd | E05F 11/382 | 49/103 |
| 3,816,963 A * | 6/1974 | Hartmeyer | E05F 11/382 | 49/103 |
| 3,859,753 A * | 1/1975 | Marcuzzi | E05F 11/382 | 49/103 |
| 3,900,965 A * | 8/1975 | Mummert | E05F 11/382 | 49/103 |
| 3,965,618 A * | 6/1976 | Pickles | E05F 11/382 | 49/103 |
| 4,000,581 A * | 1/1977 | Fukumoto | E05F 11/382 | 49/103 |
| 4,020,593 A * | 5/1977 | Salomon | E05F 11/382 | 49/103 |
| 4,502,248 A * | 3/1985 | Thomas, Jr. | B60J 1/17 | 49/374 |
| 4,571,888 A * | 2/1986 | Jensen | E05C 17/60 | 49/374 |
| 4,776,630 A * | 10/1988 | Fukutomi | B60J 7/028 | 296/107.17 |
| 4,811,517 A * | 3/1989 | Eckert | B60J 1/14 | 49/103 |
| 6,419,295 B1 * | 7/2002 | Neubrand | B60J 7/1286 | 296/107.07 |
| 6,729,672 B2 * | 5/2004 | Neubrand | B60J 7/145 | 296/107.07 |
| 8,333,423 B2 | 12/2012 | Gulker et al. | | |
| 8,661,735 B2 * | 3/2014 | Zellmer | B60J 1/14 | 296/146.2 |
| 8,727,419 B2 * | 5/2014 | Syvret | B60J 1/17 | 296/146.2 |
| 8,827,027 B2 | 9/2014 | Syvret et al. | | |
| 9,033,394 B2 | 5/2015 | Heirtzler et al. | | |
| 9,903,147 B2 * | 2/2018 | Rojas | B60J 1/17 | |
| 2001/0020347 A1 * | 9/2001 | de Gaillard | B60J 1/1861 | 49/374 |
| 2003/0052635 A1 * | 3/2003 | Schindler | B60J 7/057 | 318/445 |
| 2003/0116994 A1 * | 6/2003 | Richtor | B60J 1/12 | 296/146.16 |
| 2004/0194390 A1 * | 10/2004 | Ishikawa | B60J 1/17 | 49/352 |
| 2006/0103047 A1 | 5/2006 | Zwolinski | | |
| 2008/0088152 A1 | 4/2008 | Rietdijk | | |
| 2011/0192088 A1 * | 8/2011 | Zellmer | E05F 11/525 | 49/358 |
| 2015/0028620 A1 | 1/2015 | Gerhardt et al. | | |

OTHER PUBLICATIONS

Final Office Action dated May 13, 2019 for U.S. Appl. No. 15/499,321, filed Apr. 27, 2017.

* cited by examiner

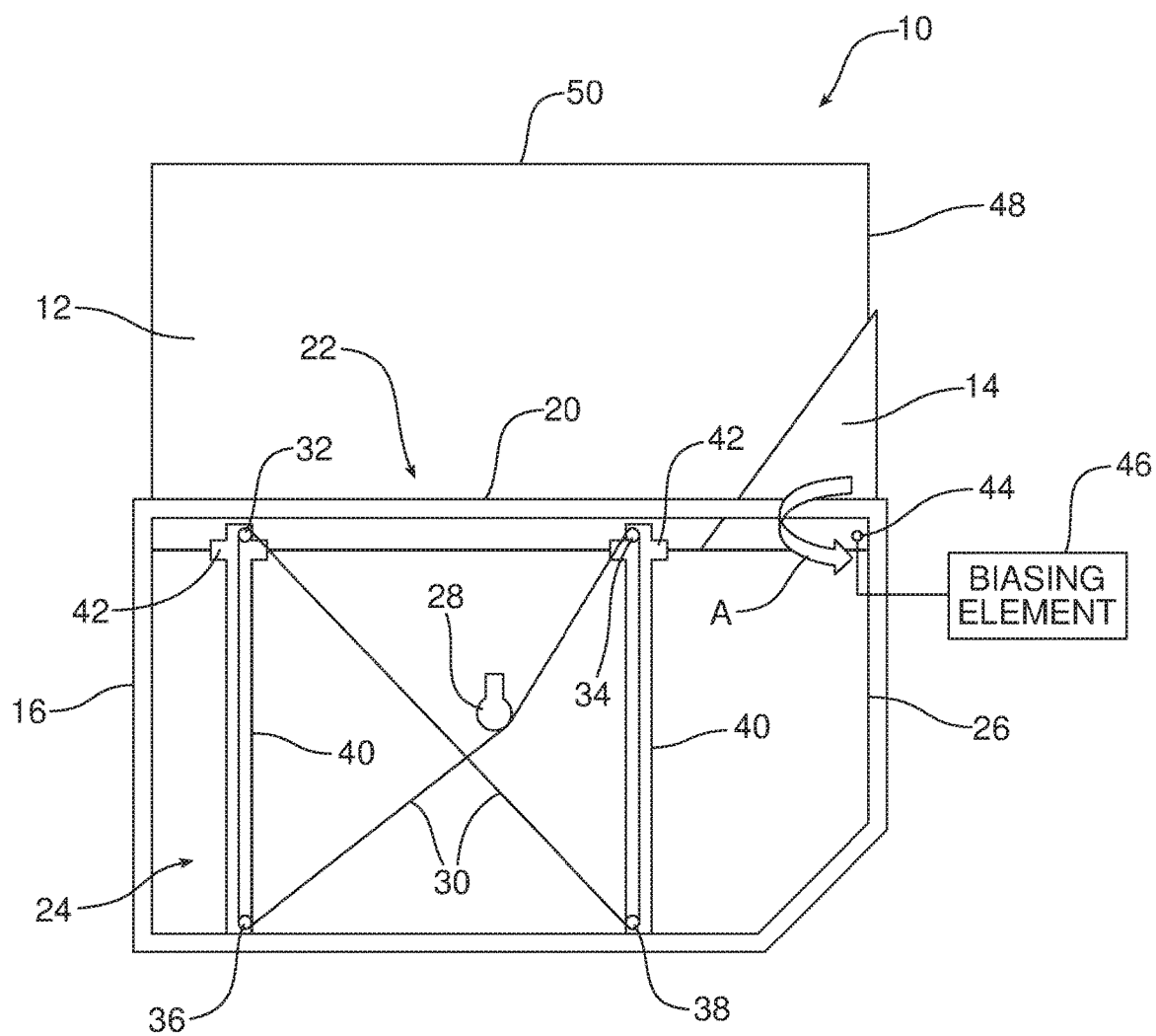

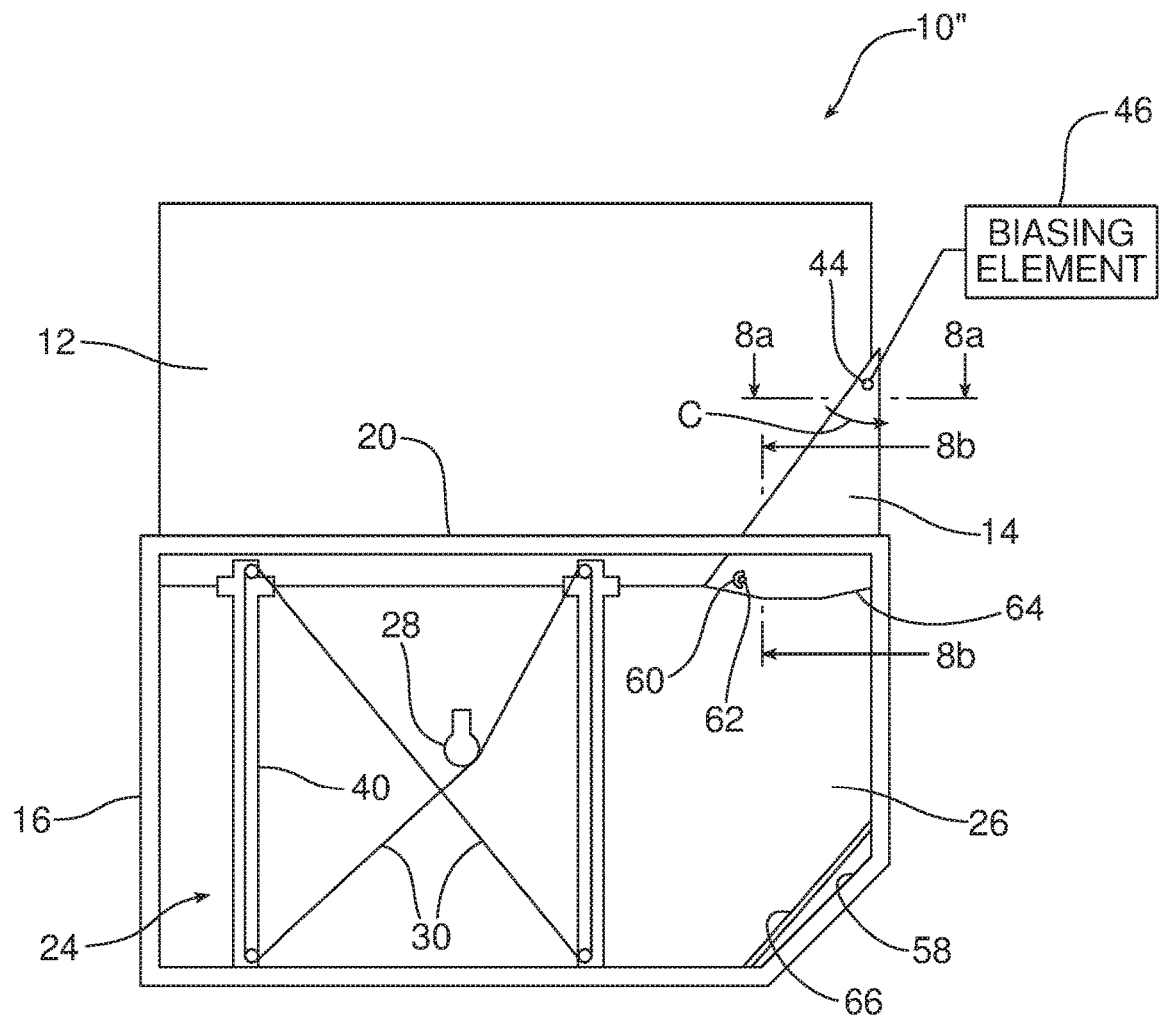

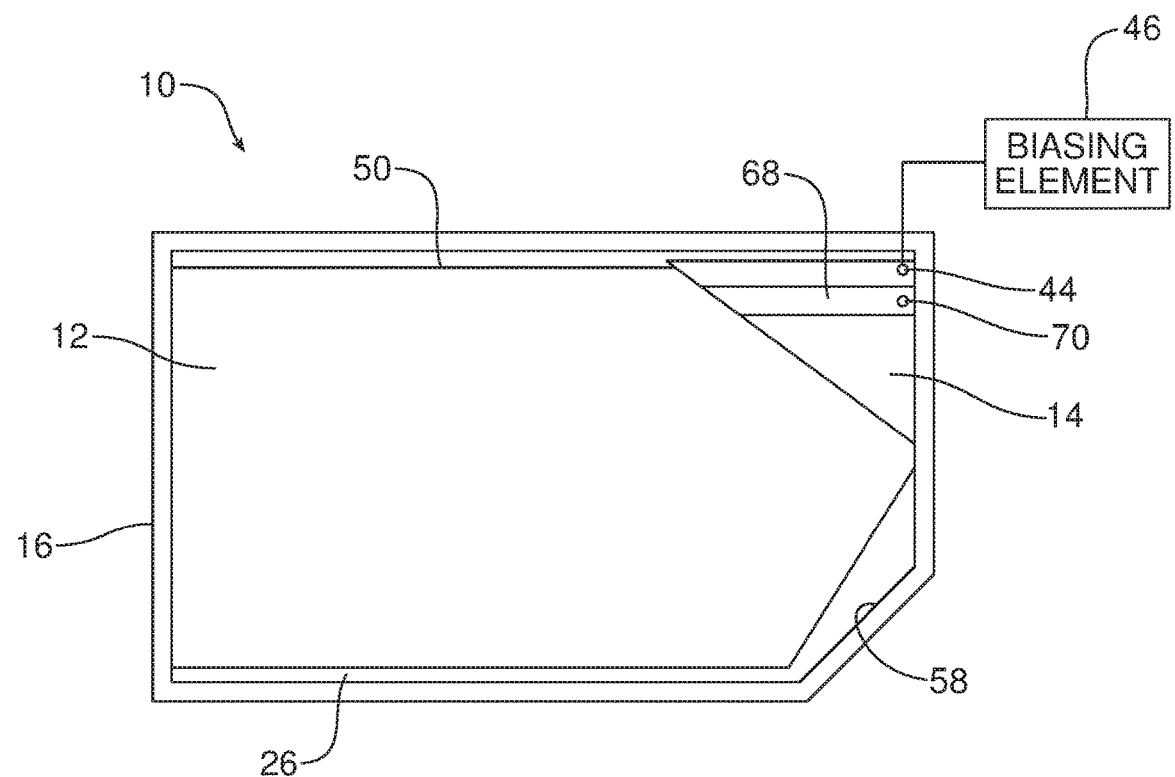

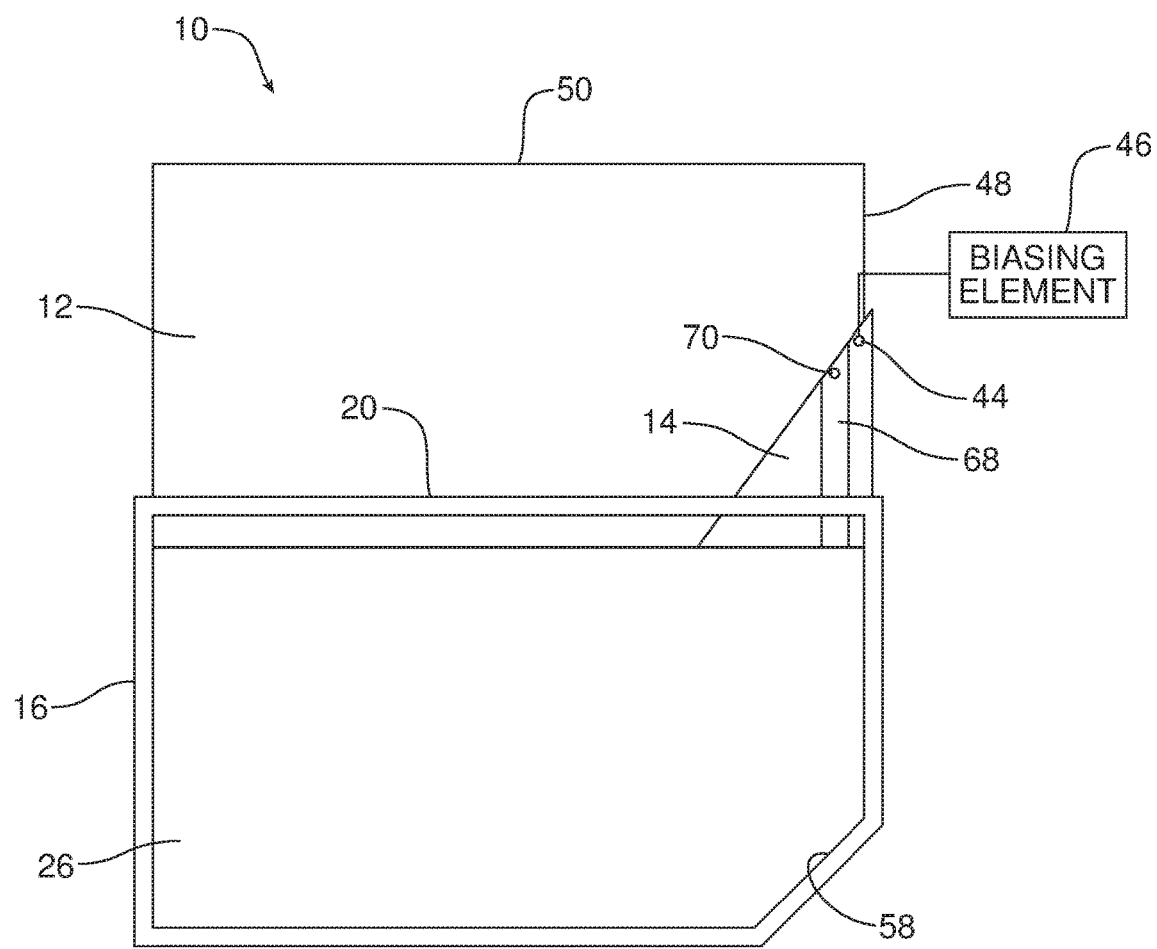

APPARATUS AND METHOD PROVIDING A FULL WINDOW OPENING ABOVE A DOOR INCLUDING A PIVOTING DIVISION BAR

TECHNICAL FIELD

This document relates generally to the motor vehicle equipment field and, more particularly, to a new and improved apparatus and method for fully lowering a window and a division bar and providing a full window opening above a door panel.

BACKGROUND

In motor vehicle applications, there are challenges with designing movable windows or door glass to drop inside of the door structure. Often, the shape of the lower door structure does not accommodate the complete lowering of a full door glass window using traditional automotive hardware systems. This is typically an issue on rear side doors, where the location of the rear wheel well might necessitate a certain shape and size of the lowered door structure that is smaller than desired, or on a front door with an outside rearview mirror that is not mounted above the belt line.

In the past this problem has generally been resolved by one of two compromises. In the first of these compromises, illustrated in FIG. 1a, the window or door glass W does not drop completely below the belt line B found on the door at the lower side of the window frame. In this situation, the vehicle occupant does not have a comfortable place to rest his arm when the window is down. Further, there is only limited room to pass items through the opening O above the window and the portion of the opening remaining covered by the window significantly limits available ventilation.

In option number 2, illustrated in FIG. 1b, the size of the movable portion of the window or door glass W is reduced so that portion may be fully opened and dropped into the door panel P. Unfortunately, this compromise limits the size of the window opening above the door and increases the cost and complexity of the window system due to, for example, the addition of a fixed piece of glass G and the division bar seal S or an applique that blocks a portion of the daylight opening.

This document relates to a new and improved apparatus and method that allow the full lowering of a window and division bar into the door panel below the beltline while avoiding the compromises set forth above.

SUMMARY

In accordance with the purposes and benefits described herein, a new and improved apparatus is provided for fully lowering a window and division bar into a door panel and providing a full window opening above the door panel. That apparatus includes (a) a door panel having a window receiver and an internal compartment, (b) a window, (c) a division bar pivotally mounted on a pivot and (d) a regulator. The regulator is carried on the door panel. The regulator displaces the window and the division bar between a closed position projecting from the window receiver and an opened position concealed within the internal compartment of the door panel.

The regulator may comprise a motor and cable drive system concealed within the internal compartment. The regulator may further include a guide rail system for guiding the window as the window is displaced between the closed position and the opened position.

In one or more of the many possible embodiments of the apparatus, the pivot is a pivot pin carried on the door panel. In addition, the apparatus may include a biasing element biasing the division bar toward the opened position. That biasing element may be a torsion spring concentrically received over the pivot pin.

In at least one of the many possible embodiments of the apparatus, the pivot may be a pivot pin carried on the window. In addition, the apparatus may include a guide track carried on the door panel. Further, the apparatus may include a guide carried on the division bar, the guide sliding along the guide track as the window and the division bar are displaced between the closed position and the opened position.

In yet one or more possible embodiments of the many possible embodiments of the apparatus, the apparatus may include a pin carried on the window. Further, the apparatus may include a catch carried on the division bar. The catch may function to engage the pin when the window and the division bar are in the closed position.

Still further, the apparatus may include a guide carried on the door panel and the division bar may engage that guide while being displaced into the opened position. Still further, the first edge of the division bar may engage and slide along the guide.

In accordance with yet another aspect, a method is provided for fully lowering a window and a division bar in order to enjoy a full-size window opening above a door panel. That method includes the steps of (a) displacing, by a regulator, a window and a division bar between a closed position projecting from a window receiver in a door panel and an opened position concealed within an internal compartment of the door panel and (b) simultaneously pivoting the division bar between a first position when the window and the division bar are in the closed position and a second position when the window and the division bar are in the opened position.

The method may further include the step of fully concealing the window and the division bar within the internal compartment of the door panel when in the opened position.

In at least one of the many possible embodiments of the method, the method includes the step of resting the division bar over a top edge of the window when in the second position. In at least one of the many possible embodiments of the method, the method may include the step of positioning the division bar around a second edge of the window when in the second position.

The method may further include the step of engaging a guide on the division bar in a guide track on the door panel to pivot the division bar. The method may also include the step of engaging the division bar against a guide carried on the door panel to pivot the division bar. Further, the method may include sliding a second edge of the division bar along the guide.

In the following description, there are shown and described several preferred embodiments of the apparatus and method. As it should be realized, the apparatus and method are capable of other, different embodiments and their several details are capable of modification in various, obvious aspects all without departing from the apparatus and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the apparatus and the method and together with the description serve to explain certain principles thereof.

FIG. 2a is a schematic illustration of a first embodiment of the apparatus showing the window and division bar in the closed position.

FIG. 6a is a detailed schematic illustration of yet another alternative embodiment of the apparatus illustrating the window and division bar in the fully closed position.

Figure 8A:
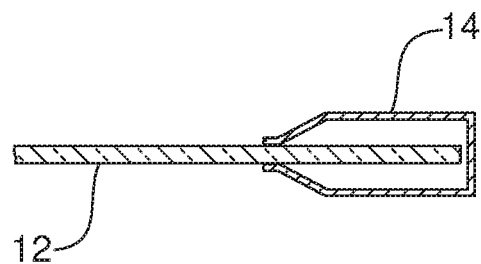
Figure 8B:
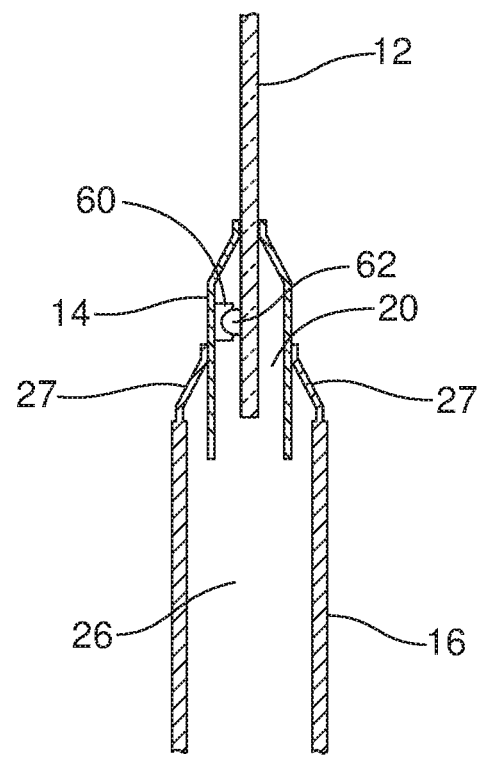

FIGS. 8a and 8b are respective cross-sectional views along lines 8a-8a and 8b-8b of FIG. 6a.

FIGS. 9a and 9b are respective schematic illustrations of an alternative embodiment of the apparatus including a pin on the window that slides in a channel on the division bar.

Reference will now be made in detail to the present preferred embodiments of the apparatus and method, examples of which are illustrated in the accompanying drawing figures.

DETAILED DESCRIPTION

Reference is now made to FIGS. 2a, 2b and 3a-3f illustrating a first possible embodiment of the new and improved apparatus 10 for fully lowering a window 12 and cooperating division bar 14 into a door panel 16 and providing a full-size opening 18 above the door panel. The door panel 16 has a window receiver 20 along the top edge of the door panel 16 which forms part of a belt line of the motor vehicle.

The window 12 and the division bar 14 are carried on the door panel 16. A regulator 24 is carried in an internal compartment 26 of the door panel 16. As will be apparent from the following description, the regulator 24 displaces the window 12 and the division bar 14 between a fully raised or closed position illustrated in FIG. 2a wherein the window and the division bar project above the door panel through the window receiver 20 and an opened position, illustrated in FIG. 2b wherein the window and division bar 14 are lowered below the top edge and the belt line 22 of the motor vehicle and fully concealed within the internal compartment 26 of the door panel 16.

In the illustrated embodiment, the regulator 24 comprises a single motor 28 and cooperating cable drive system 30 stretched over a series of pulleys 32, 34, 36, 38. The regulator 24 also includes a guide rail system comprising two guide rails 40. Two window lift brackets 42 connected to the window 12 slide along the guide rails 40 as the window 12 and the division bar 14 are displaced between the closed and opened positions by the drive motor 28. The window regulator 24 is fully illustrated in FIG. 2a but has been removed from FIGS. 2b and 3a-3f in order to more clearly illustrate the operation of the window 12 and the division bar 14.

As further illustrated in FIGS. 2a, 2b and 3a-3f, the division bar 14 is pivotally mounted on a pivot in the form of a pivot pin 44 carried on the door panel 16. The apparatus 10 also includes a biasing element 46 for biasing the division bar 14 toward the opened position illustrated in FIGS. 2b and 3f. In the illustrated embodiment, the biasing element 46 is a torsion spring concentrically received over the pivot pin 44.

The operation of the first embodiment of the apparatus 10 illustrated in FIGS. 2a, 2b and 3a-3f will now be described in detail. As the window 12 is initially displaced from the fully closed position illustrated in FIGS. 2a and 3a to the fully opened position illustrated in FIGS. 2b and 3f, the window 12 is lowered through the window receiver 20 into the internal compartment 26 of the door panel 16 by the regulator 24. The division bar 14 is held and maintained in a first position projecting through the window receiver 20 above the door panel 16 until the window drops below (a) the top edge of the door panel 16/the belt line 22 of the motor vehicle and (b) the pivot pin 44 in the door panel 16. See FIGS. 3a-3e. More specifically, the edge 48 of the window 12 engages the division bar 14 holding it in this first position.

Figure 7:
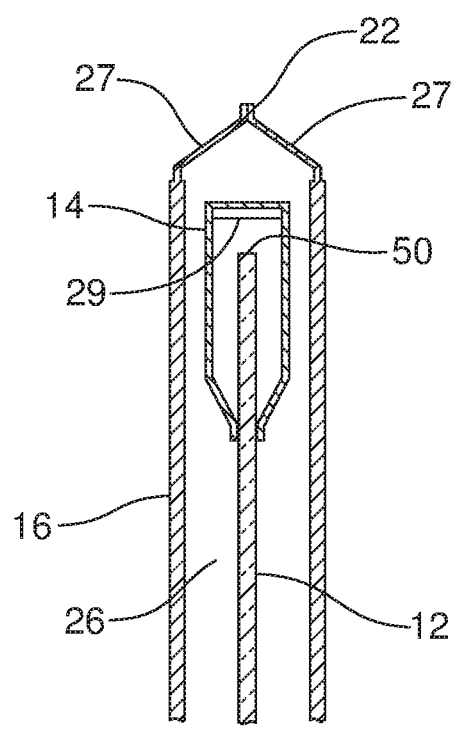
FIG. 7 is a cross-sectional view along line 7-7 of FIG. 2b.

Once the window 12 is lowered below the pivot pin 44, the trailing edge 48 of the window 12 no longer contacts the division bar 14 and the division bar 14 is then biased by the biasing element 46 so as to pivot about the pivot pin 44 in the direction of action arrow A. Here it should be appreciated that the division bar 14 straddles the window 12 and the biasing element 46 functions to displace the division bar 14 until the division bar rests over a top edge 50 of the window 12 in a second, lowered position fully concealed within the door panel 16. See FIG. 7 showing the division bar 14 straddling the top edge 50 of the window 12 and concealed in the internal compartment 26 of the door panel 16 below the window seals 27 and the belt line 22.

Figure 1A:
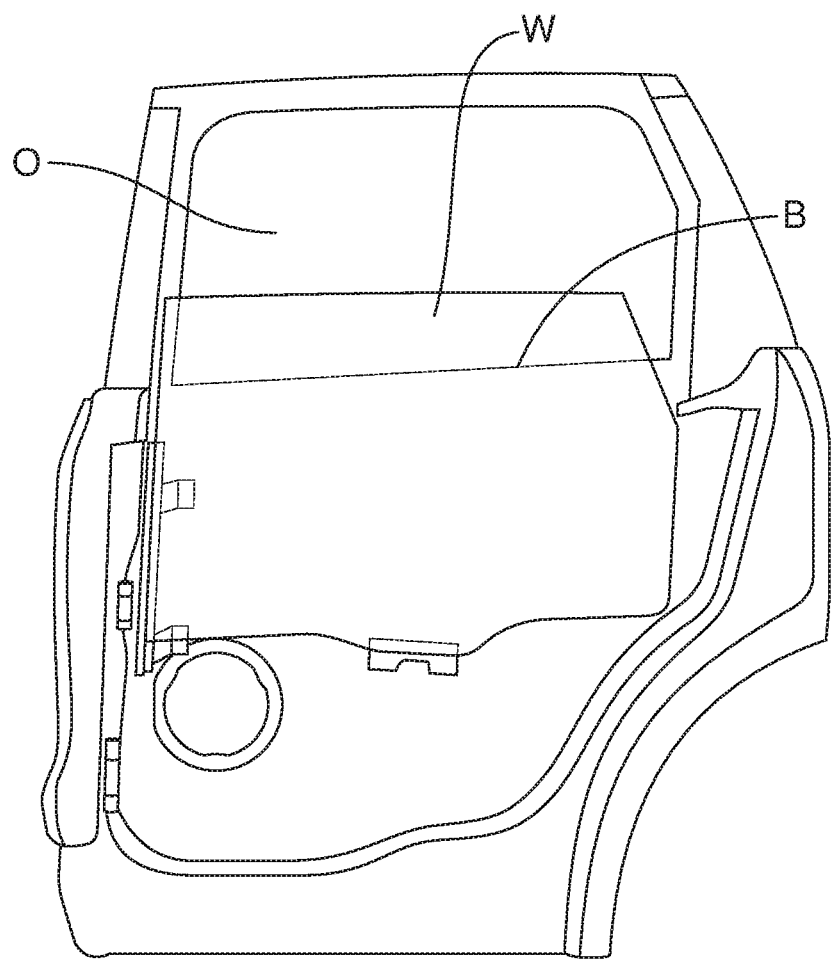
FIG. 1a illustrates one type of prior art compromise made when a door panel will not accommodate fully opening a full-size window or door glass.
Figure 1B:
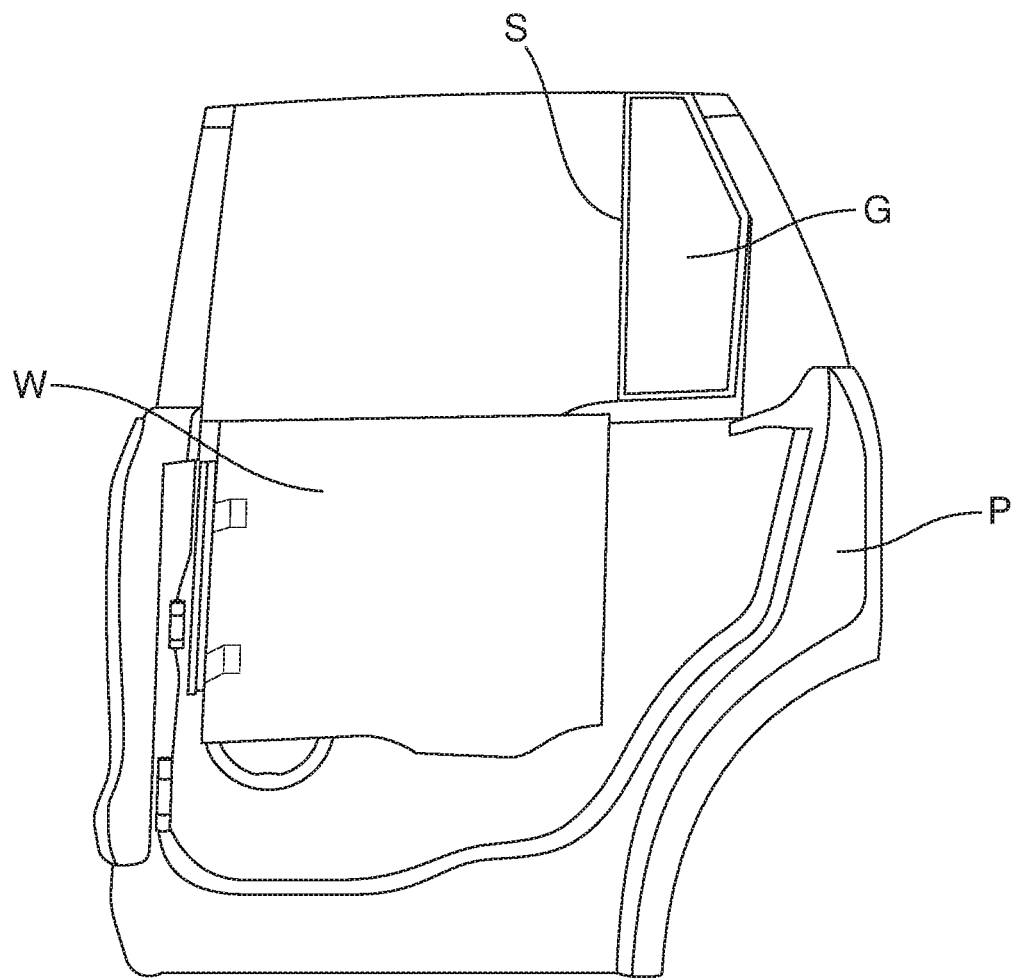
FIG. 1b illustrates a second type of prior art compromise made when a door panel will not accommodate fully opening a full-size window or door glass.
Figure 2B:
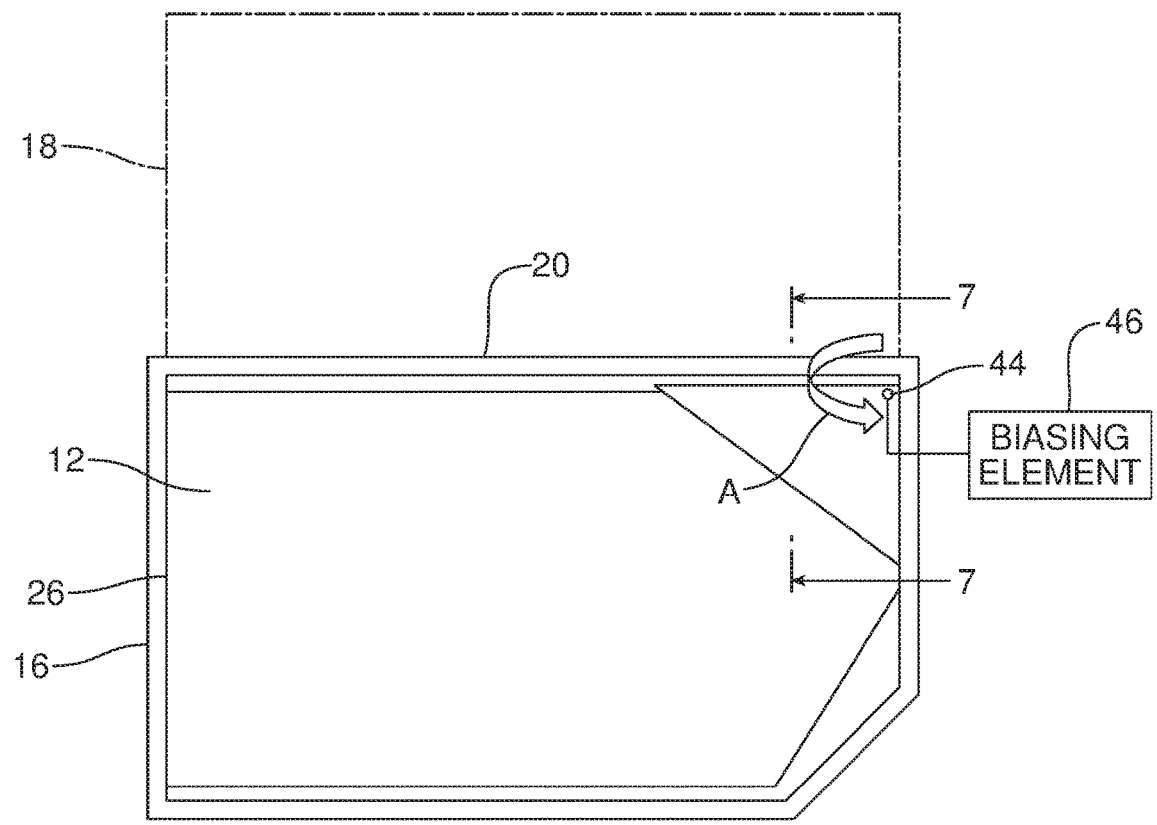
FIG. 2b is an illustration similar to FIG. 2a but showing the window and division bar in the opened position.
Figure 3A:
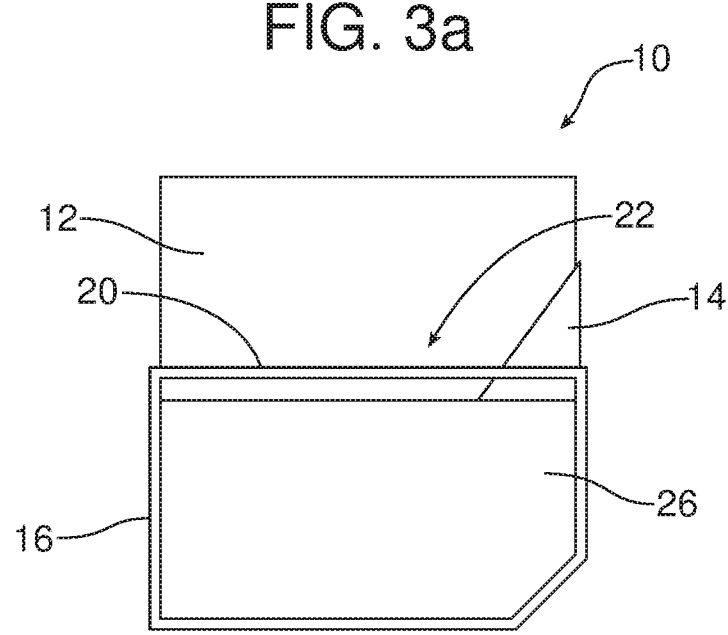
FIGS. 3a-3f are a series of schematic illustrations showing the movements of the window and division bar as the window and division bar are displaced between the fully closed position illustrated in FIG. 3a and the fully opened position illustrated in FIG. 3f.
Figure 3B:
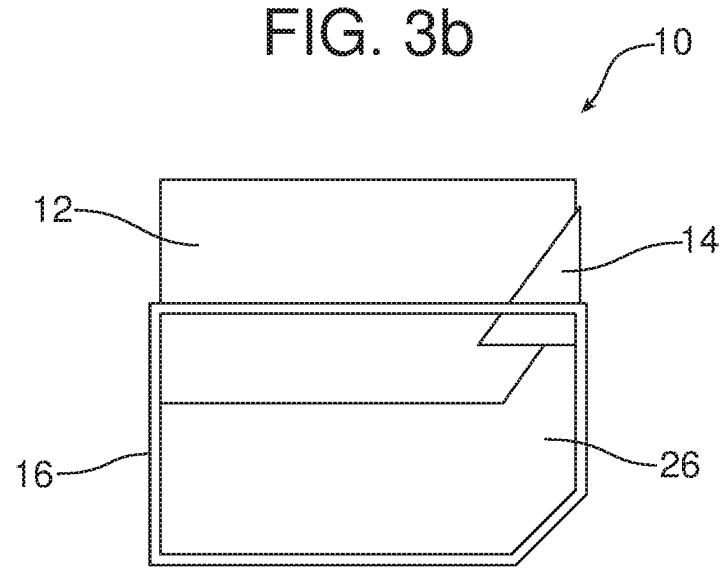
Figure 3C:
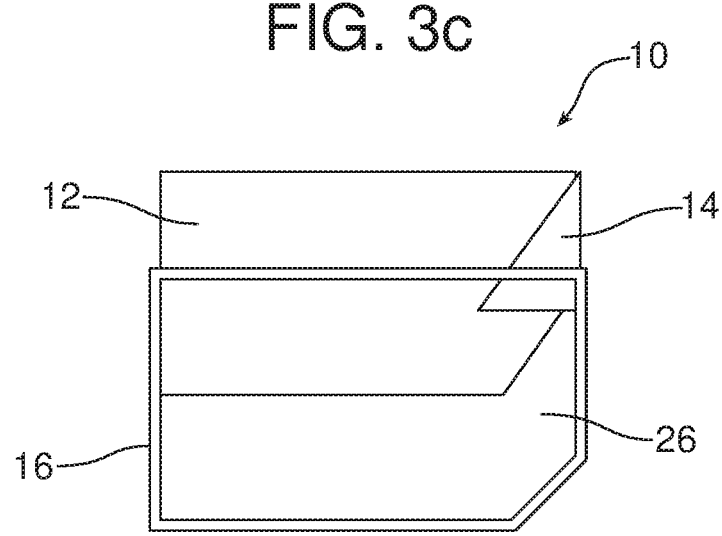
Figure 3D:
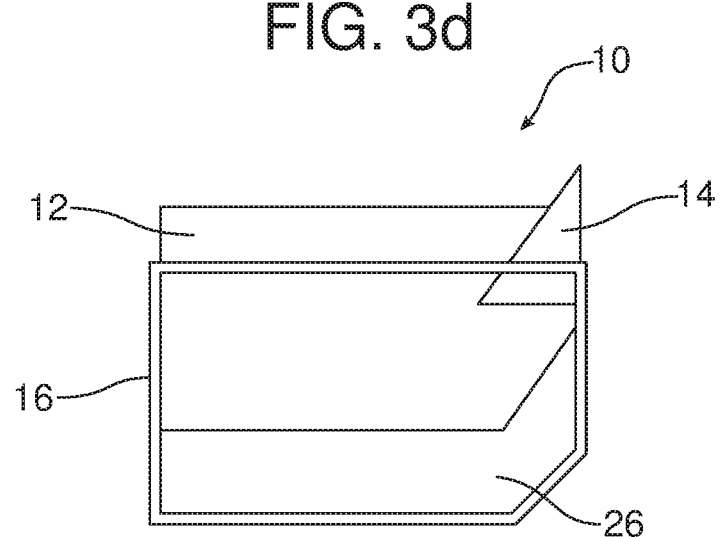
Figure 3E:
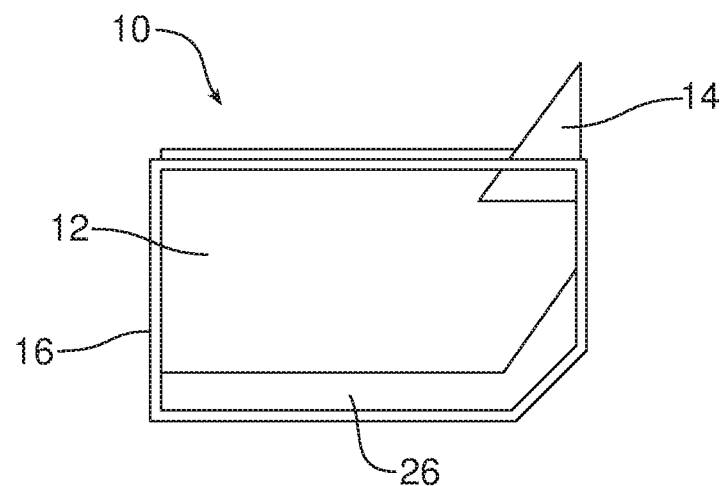
Figure 3F:
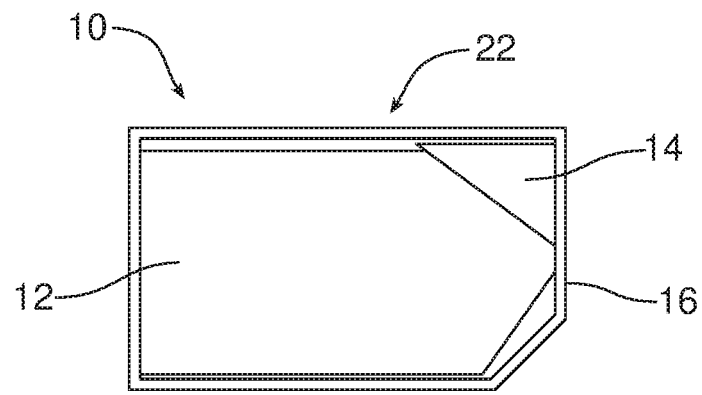

When the window 12 is displaced from the opened position illustrated in FIGS. 2b and 3f to the closed position illustrated in FIGS. 2a and 3a, the regulator 24 raises the window 12 with the top edge 50 of the window 12 engaging the division bar 14 and pivoting the division bar 14 about the pivot pin 44 against the force of the biasing element 46 until the division bar 14 returns to the first position as illustrated in FIG. 3e. The division bar 14 is maintained in this first position by the window edge 48 as the window 12 continues to rise to the fully closed position as illustrated in FIGS. 3d, 3c, 3b and 3a. The division bar 14 includes a low friction, long wearing material 29 on the inside surface that engages the window 12. Such a material may comprise, for example, HDPE-high density polyethylene or acetal.

A second, alternative embodiment of the apparatus 10' is illustrated in FIGS. 4a, 4b and 5a-5f. The apparatus 10' illustrated in these figures differs from the apparatus 10 illustrated in FIGS. 2a-2d in several respects. First, the pivot pin 52 is carried on the window 12 instead of the door panel 16. Second, a guide track 54 is carried on the door panel 16. Third, a guide 56 is carried on the division bar 14. That guide 56 engages and slides along the guide track 54. Fourth, the biasing element 46 has been eliminated.

Figure 4A:
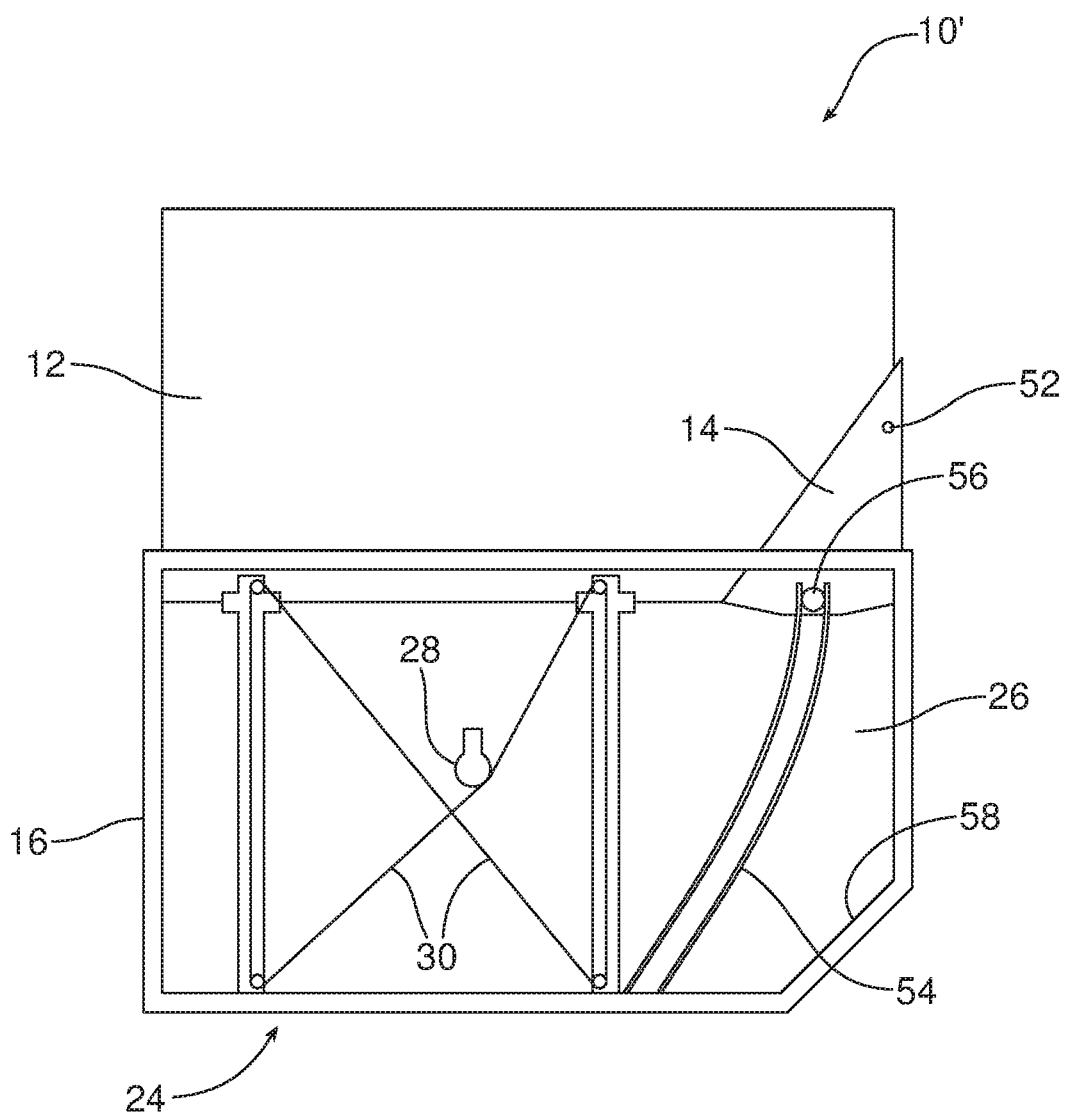
FIG. 4a is a detailed schematic illustration of a second possible embodiment of the apparatus illustrating the window and division bar in the fully closed position.
Figure 4B:
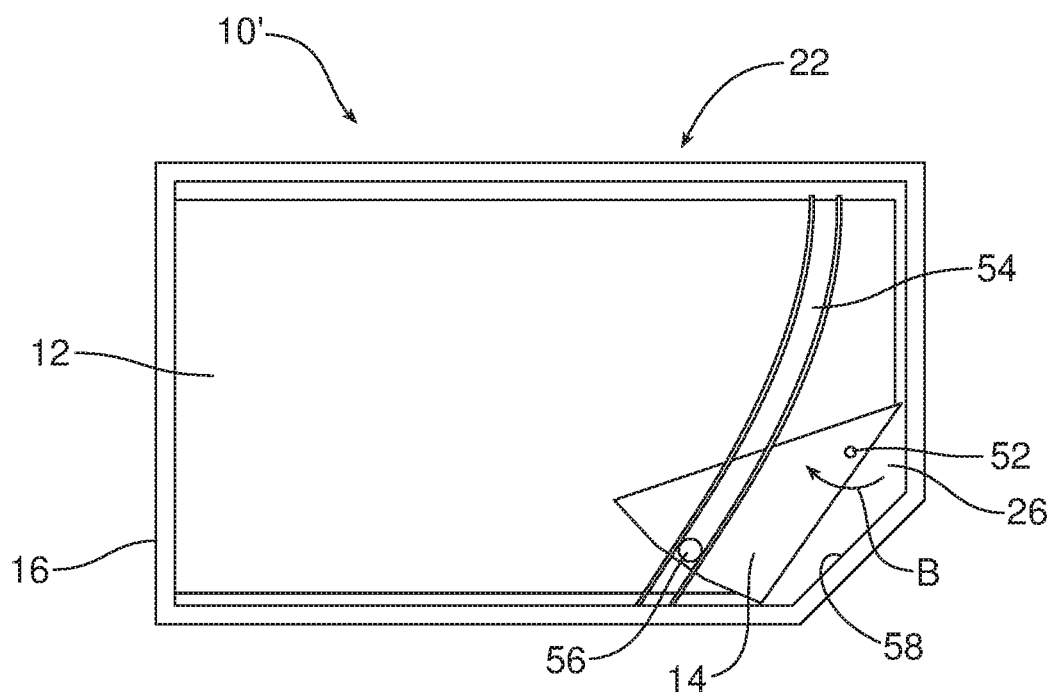
FIG. 4b is a view similar to FIG. 4a but illustrating the window and division bar in the fully opened position.
Figure 5A:
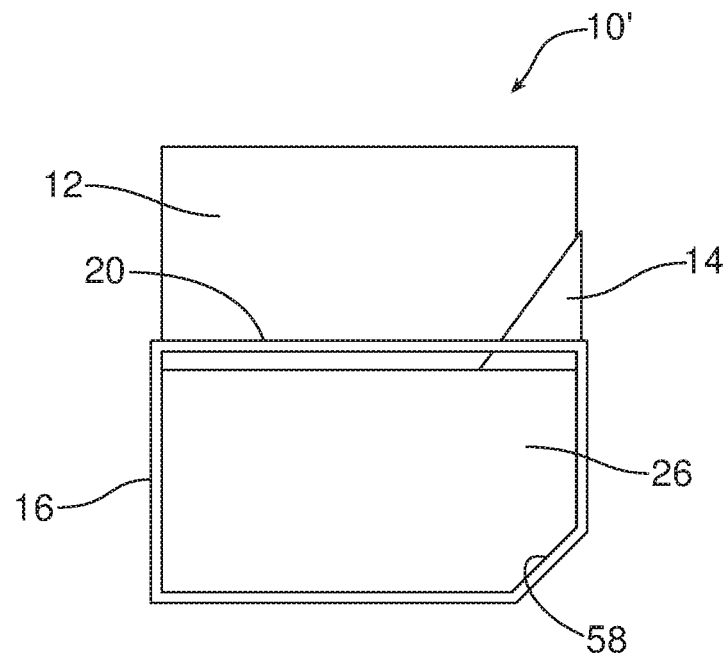
FIGS. 5a-5f are a series of schematic illustrations showing the displacement of the window and division bar of the second embodiment illustrated in FIGS. 4a and 4b between the fully closed position illustrated in FIG. 5a and the fully opened position illustrated in FIG. 5f.
Figure 5B:
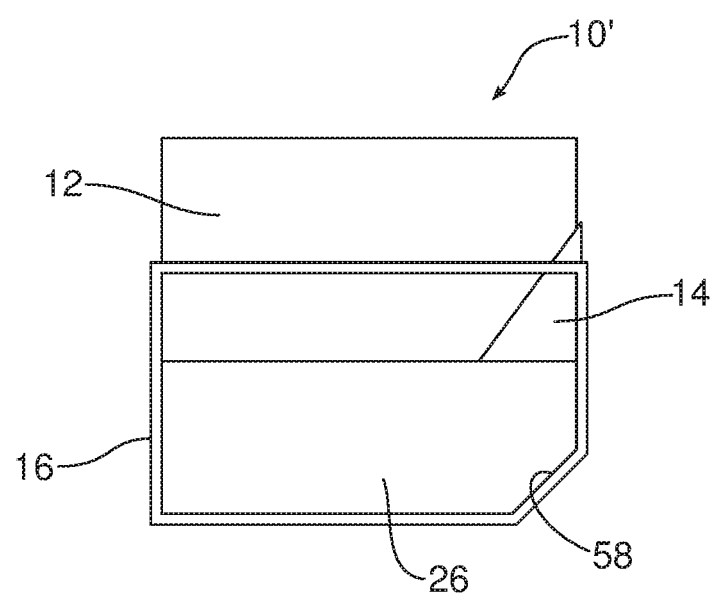
Figure 5C:
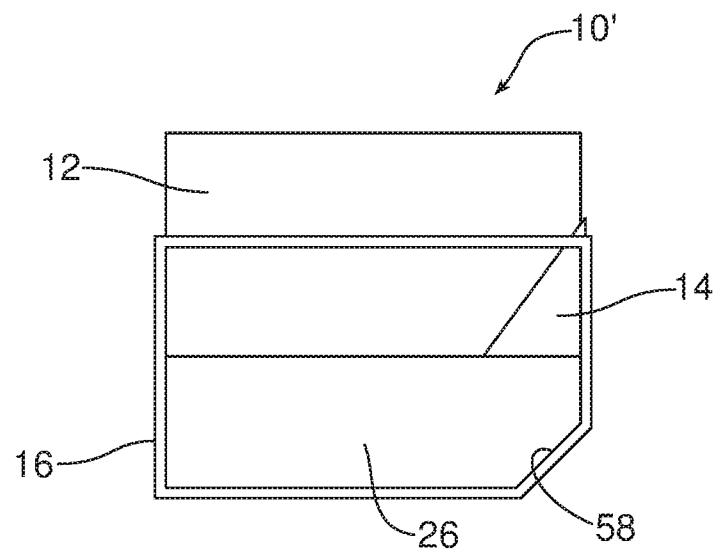
Figure 5D:
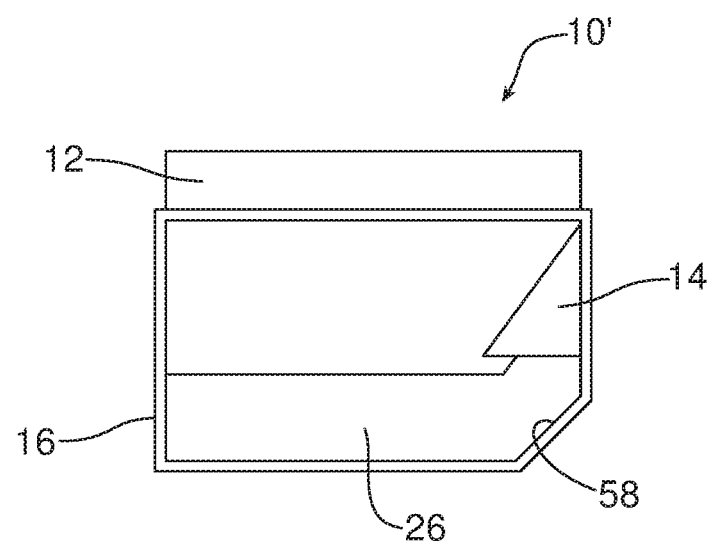
Figure 5E:
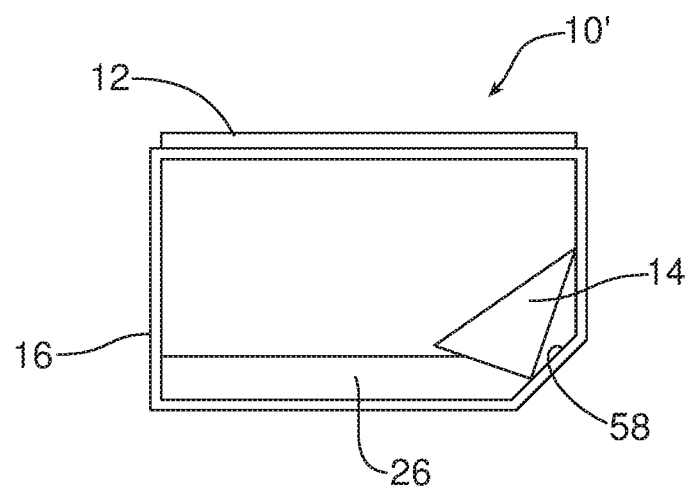
Figure 5F:
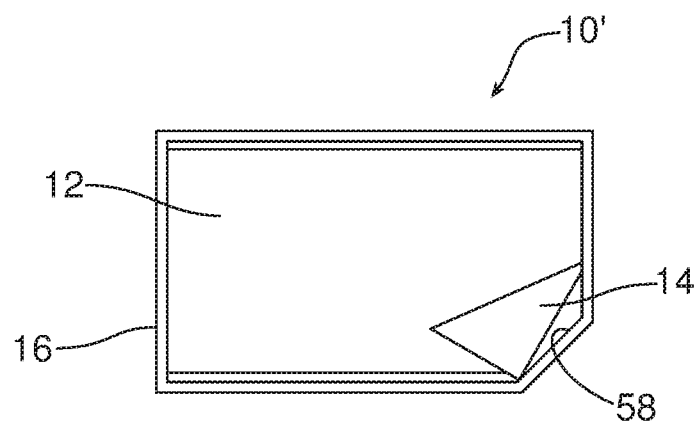

When the window 12 of the apparatus 10' is displaced from the fully closed position illustrated in FIGS. 4a and 5a to the fully opened position illustrated in FIGS. 4b and 5f, by operation of the regulator 24, the division bar 14 is lowered with the window 12. As the guide 56 travels along the guide track 54, the division bar 14 is pivoted about the pivot pin 44 in the direction of action arrow B so as to clear and accommodate the cutoff corner 58 at the bottom of the door panel 16 thereby allowing the window 12 and division bar 14 to be fully lowered and concealed inside the internal compartment 26 of the door panel 16 when in the fully opened position illustrated in FIGS. 4b and 5f. FIGS. 5b-5f illustrate the pivotal displacement of the division bar 14 with respect to the window 12 about the pivot pin 44 as the guide 56 follows the curved guide track 54.

Figure 6B:
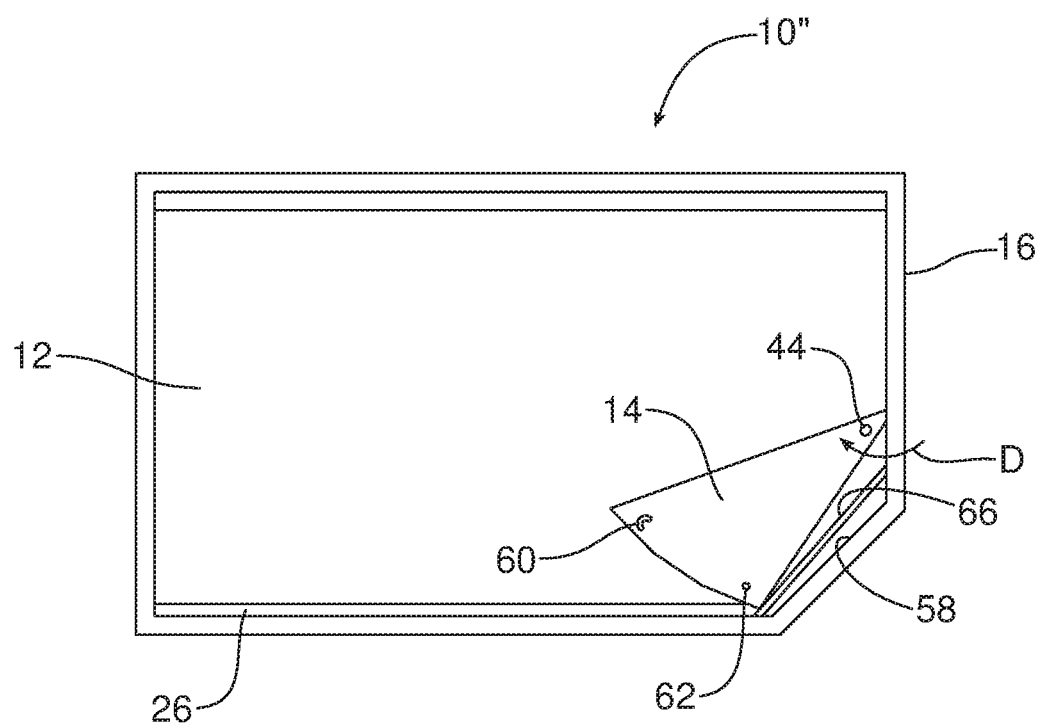
FIG. 6b is a view similar to FIG. 6a but illustrating the window and division bar in the fully opened position.

Reference is now made to FIGS. 6a and 6b illustrating a third possible embodiment of the apparatus 10". In this embodiment, the division bar 14 pivots about a pivot pin 44 carried on the window 12. A biasing element 46, in the form of a torsion spring concentrically received over the pivot pin 44 functions to bias the division bar 14 in the direction of action arrow C toward the first position illustrated in FIG. 6a. In this position, a catch 60 on the division bar 14 engages a pin 62 on the window 12. See also FIGS. 8a and 8b showing cross sections of the window 12 and division bar 14 in the closed positions.

When the regulator 24 is activated to displace the window 12 and division bar 14 from the fully closed position illustrated in FIG. 6a to the fully opened position illustrated in FIG. 6b, the window 12 and division bar 14 are lowered together through the window receiver 20 into the internal compartment 26 of the door panel 16. As the lowering continues, a cam surface 64 at the second edge of the division bar 14 engages a ramp, wear surface or guide 66 carried on the door panel 16 adjacent the cutoff corner 58 at the second edge thereof. This engagement causes the division bar 14 to be pivoted against the biasing force of the biasing element 46 about the pivot pin 44 in the direction of action arrow D into a second position providing clearance for the cutoff corner 58 and accommodating the full lowering of the window 12 and division bar 14 into the door panel 16 where they are both fully concealed from view.

When the regulator 24 is activated to displace the window 12 and division bar 14 from the fully opened position illustrated in FIG. 6b to the fully closed position illustrated in FIG. 6a, the biasing element 46 tends to bias the division bar 14 from the second position illustrated in FIG. 6b to the first position illustrated in FIG. 6a. Consequently, when the window 12 and division bar 14 are fully raised, they provide a fully closed opening 18 above the door panel 16. Here it should be appreciated that the catch 60 engages the pin 62 to hold the division bar 14 in the desired closing or first position against the biasing force of the biasing element 46.

Consistent with the above description, a method is provided for fully opening and closing a window 12 and a division bar 14 carried on a door panel 16. That method may be broadly described as including the steps of: (a) displacing, by the regulator 24, the window 12 and the division bar 14 between a closed position, projecting from the window receiver 20 in the door panel 16, and an opened position concealed within an internal compartment 26 of the door panel and (b) simultaneously pivoting the division bar 14 between a first position when the window 12 and division bar 14 are in the closed position and a second position when the window 12 and the division bar 14 are in the opened position. See, for example, FIGS. 2a and 2b illustrating the first embodiment of the apparatus 10 in the respective closed position and opened position. See also FIGS. 4a and 4b illustrating the second embodiment of the apparatus 10' in the respective closed position and opened position. See also FIGS. 6a and 6b illustrating the third embodiment of the apparatus 10" in the respective closed position and opened position. As should be appreciated, in any of the embodiments of the apparatus 10, 10', 10", the method also includes fully concealing the window 12 and the division bar 14 within the internal compartment 26 of the door panel 16 when in the opened position.

In the first embodiment of the apparatus 10, the method includes resting the division bar 14 over the top edge 50 of the window 12 when in the second position. In contrast, for the second and third embodiments of the apparatus 10', 10", the method includes the step of positioning the division bar 14 around a second edge of the window 12 when in the second position.

In the second embodiment of the apparatus 10", the method further includes the step of engaging the guide 56 on the division bar 14 in a guide track 54 carried on the door panel 16 to pivot the division bar 14. In contrast, in the third embodiment of the apparatus 10", the method includes the steps of engaging the division bar 14 against a guide 66 carried on the door panel 16 to pivot the division bar. Further, the method includes sliding the cam surface 64 at the second edge of the division bar 14 along that guide 66 in order to pivot the division bar 14 into the second position and accommodate full opening of the window 12.

In summary, numerous benefits are provided by the various embodiments of the apparatus 10, 10', 10" and method for fully opening and closing a window 12 and a division bar 14 of a door panel 16. Advantageously, they allow a user to conveniently enjoy the full benefits of the entire open area above a door panel 16 with both the window 12 and division bar 14 being fully concealed within the internal compartment 26 of the door panel 16 below the belt line 22 of the motor vehicle when in the fully opened position. Further, it should be appreciated that the window 12 and division bar 14 are displaced between the fully closed and fully opened positions simultaneously and by means of a regulator 24 incorporating a single drive motor 28. Thus, all embodiments of the apparatus 10, 10', 10" have a relatively simple construction that is easy to manufacture and assemble, is relatively inexpensive and provides a long service life.

The foregoing has been presented for purposes of illustration and description. It is not intended to be exhaustive or to limit the embodiments to the precise form disclosed. Obvious modifications and variations are possible in light of the above teachings. For example, as illustrated in FIGS. 9a and 9b, the embodiment of the apparatus 10 illustrated in FIGS. 2a, 2b and 3a-3f may be modified so that the division bar 14 includes a channel 68 to receive a pin 70 on the window 12. When raised, the top edge 50 of the window 12 initially pushes on the division bar 14 to raise the division bar to the upright position illustrated in FIG. 9b. Once the division bar 14 is raised into the first position, the pin 70 on the window 12 enters the channel 68 and the force of the biasing element 46 is focused between the channel and the pin. This reduces the force applied by the biasing element 46 between the window 12 and the division bar 14 at the edge 48 where sealing occurs. All such modifications and variations are within the scope of the appended claims when interpreted in accordance with the breadth to which they are fairly, legally and equitably entitled.

What is claimed:

1. An apparatus, comprising:
a door panel having a window receiver and an internal compartment;
a window;
a division bar pivotally mounted on a pivot pin carried on said door panel;
a regulator carried on said door panel, said regulator displacing said window and said division bar between a closed position projecting from said window receiver and an opened position concealed within said internal compartment; and
a biasing element biasing said division bar toward said opened position.

2. The apparatus of claim 1, wherein said regulator comprises a motor and cable drive system concealed within said internal compartment.

3. The apparatus of claim 2, wherein said regulator further includes a guide rail system for guiding said window as said window is displaced between said closed position and said opened position.

4. The apparatus of claim 1, wherein said biasing element is a torsion spring concentrically received over said pivot pin.

* * * * *